Aug. 11, 1925. 1,548,985

J. A. DICKENSON

TIRE CARRIER

Filed Feb. 6, 1924

Inventor

James A. Dickenson.

Patented Aug. 11, 1925.

1,548,985

UNITED STATES PATENT OFFICE.

JAMES A. DICKENSON, OF EDMONTON, ALBERTA, CANADA.

TIRE CARRIER.

Application filed February 6, 1924. Serial No. 690,944.

*To all whom it may concern:*

Be it known that I, JAMES A. DICKENSON, a citizen of the United States, residing at Edmonton, in the Province of Alberta and Dominion of Canada, have invented certain new and useful Improvements in a Tire Carrier, of which the following is a specification.

This invention relates to improvements in tire carriers, and an important object of the invention is to provide a tire carrier which will greatly lessen the labor required in lowering the spare tire to the ground.

A further object of the invention is to provide a device of this character which is so constructed as to provide means for compensating the weight of the tire when lowering the same. A still further object of the invention is to provide a device of this character which is comparatively simple, durable, and efficient for the purpose intended.

Other objects and advantages of this invention will be obvious in the course of the following description.

In the accompanying drawing forming a part of this specification, and in which like numerals are employed to designate like parts throughout the same:

Figure 1:
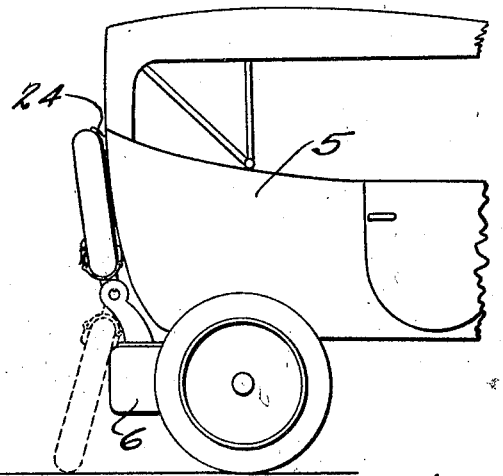
Figure 1 is a side elevation showing the device secured to an automobile.
Figure 2:
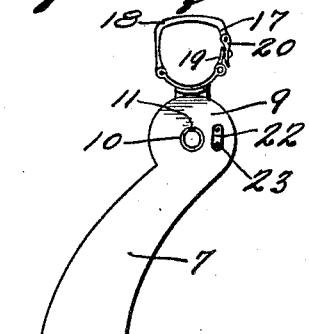
Figure 2 is an enlarged side elevation of the invention.
Figure 3:
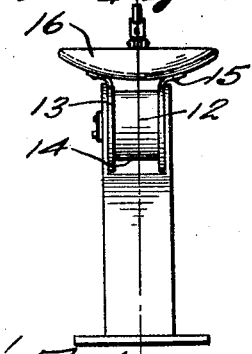
Figure 3 is a front elevation of the same.
Figure 5:
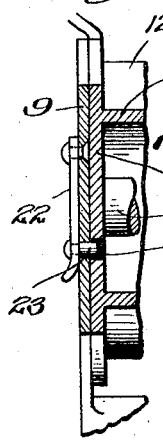
Figure 5 is a vertical section through the means for locking the tire clamp in raised position.
Figure 4:
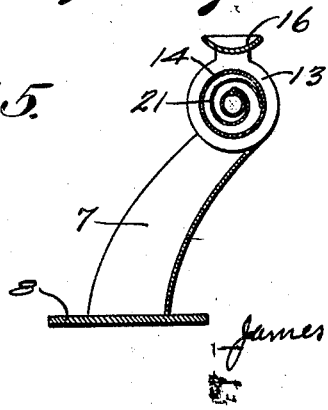
Figure 4 is a vertical sectional view taken on line 4—4 of Figure 3.

In the drawing, wherein for the purpose of illustration is shown the preferred embodiment of my invention, the numeral 5 denotes a conventional type of automobile, and 6 the gas tank which is shown secured to the rear of the body. It will be understood by those familiar with the art that it is customary to so place the gasolene supply tank although this is not always the case.

In the event that the gas tank is not so positioned the carrier may be secured directly to the body or in some other manner.

The numeral 7 designates a supporting bracket which is constructed of a channel shaped bar curved outwardly in order to permit convenient operation. The lower extremity of the bracket 7 is provided with a flange plate 8 provided with a plurality of apertures for securing the same to the gas tank or the body of the automobile. The upper extremity of the bracket 7 has a pair of circular guide plates 9 formed thereon, the center of the guide plates being provided with apertures. A tubular shaft 10 is adapted to be fitted into the central opening in the guide plates 9, a key-way being formed through the shaft engaging a projection 11 formed on the guide plates and projecting slightly within the central opening thereof. It is obvious that this arrangement will securely maintain the shaft in position and prevent rotation thereof.

Mounted upon the shaft 10 between the guide plates 9 is a circular drum generally denoted by the numeral 12, composed of a pair of circular end plates 13, and a connecting band 14, the said band having a longitudinal aperture therein. A pair of braces 15 are formed on the upper extremities of the drum plates 13 and carry a tire bracket 16, the braces 15 being riveted or otherwise secured to the tire bracket. The spare tire is securely retained upon the bracket 16 by means of a clamp 17 which is constructed of an angular bent arm 18 pivotally connected to one side of the bracket, and an extension bar 19 also pivoted to the tire bracket 16, opposite the angular arm 18, and a swinging catch 20 which is pivoted to the extremity of the arm 18 upon an eccentric pivot and in the closed position engaging an extension link formed on the arm 19. It will be noted from the construction that the swinging catch 20 will remain in the downward position when so operated, the eccentric pivot preventing movement thereof until actuated by the operator. The clamp may be further protected from displacement by inserting a lock thru the clip formed upon the extension arm 19.

In order to compensate for the weight of the tire when the drum 12 on which the tire is mounted, rotates, I provide a coiled main spring 21, the inner extremity being secured to the tubular shaft 10 by means of the longitudinal opening formed therein, and the outer extremity being secured to the drum 14 by means of the aforementioned longitudinal groove therein provided. A spring lever 22 is secured at one extremity thereof to one of the guide plates 9, while the other extremity thereof carries a pin 23 which is adapted to engage in an aperture 23' formed in one of the drum plates 13 for preventing rotation or turning movement of the drum on the pin 10.

In use, the device may be readily mounted upon the gas tank as illustrated in Figure 1, or in any other convenient manner upon an automobile, or other vehicle. When the device is employed as a carrier it may be retained in the position shown in Figure 1, the upper portion of the tire being secured to the body by means of a conventional type of bracket 24, and the lower portion being secured by the device embodying my invention. In the dotted position shown in the drawing the tire is shown in a downward position resting upon the ground and about to be rolled off. It is obvious that the action of the spring 21 within the drum will greatly assist the operator in lowering the spare tire or raising the same, thus lessening the labor required in these operations, and providing a simple and efficient means for securing spare tires upon the machine.

It is to be understood that the form of my invention herewith shown and described is to be taken as a preferred example of the same, and that various changes as to the shape, size, and arrangement of parts may be resorted to without departing from the spirit of the invention, or the scope of the subjoined claims.

Having thus described my invention, I claim:

1. A tire carrier of the character described, comprising a supporting bracket, a flange formed on the lower extremity of the supporting bracket, a pair of guide plates formed on the upper extremity of said bracket, a tubular shaft mounted through the said guide plates, a rotatable drum mounted upon the said shaft, a tire bracket, a coiled spring connected to the tubular shaft and drum, and a locking lever for preventing rotation of the said drum.

2. A tire carrier of the character described, comprising a channel shaped supporting bracket, a flange formed in the lower portion of the said bracket, a pair of circular guide plates formed in the upper extremity of the said bracket, a rotatable drum positioned between the said guide plates, a tubular shaft mounted between the said guide plates and forming a bearing for the said drum, a tire bracket carried by the said drum, a tire clamp hingedly connected with the upper portion of the said tire bracket, a coiled spring secured to the said shaft and drum, and a swinging clamp for engaging the said drum for preventing rotation thereof.

3. A tire carrier of the character described, comprising a channel shaped supporting bracket, a flange formed on the lower extremity of the said bracket, a pair of circular guide plates formed on the upper portion of the bracket, a rotatable drum positioned between the said guide plates, a tubular shaft mounted in the said guide plates and supporting the said drum, a tire bracket secured to braces formed on the upper portion of the said drum, a tire clamp hingedly connected with the said tire bracket, a compensating spring secured to the tubular shaft and rotatable drum, a swinging lever secured to the side of the guide plates, and a movable pin carried by the lever and adapted to engage the rotatable drum.

In testimony whereof, I have affixed my signature in the presence of two witnesses.

JAMES A. DICKENSON.

Witnesses:
GLADYS CUFF,
DOROTHY HOPLEY.